(12) United States Patent
Tashiro

(10) Patent No.: US 10,944,885 B2
(45) Date of Patent: Mar. 9, 2021

(54) IMAGE PROCESSING APPARATUS, METHOD, AND COMPUTER PRODUCT LOW PASS FILTERING CORRECTION COEFFICIENT FOR CORRECTING IMAGE THEN SUBJECT TO HALFTONE PROCESSING

(71) Applicant: CANON KABUSHIKI KAISHA, Tokyo (JP)

(72) Inventor: Hideyasu Tashiro, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/844,903

(22) Filed: Apr. 9, 2020

(65) Prior Publication Data

US 2020/0358923 A1    Nov. 12, 2020

(30) Foreign Application Priority Data

May 9, 2019    (JP) .............................. JP2019-089365

(51) Int. Cl.
*H04N 1/405* (2006.01)
*H04N 1/409* (2006.01)

(52) U.S. Cl.
CPC ............. *H04N 1/405* (2013.01); *H04N 1/409* (2013.01); *H04N 1/4052* (2013.01)

(58) Field of Classification Search
CPC ......... H04N 1/405–4058; H04N 1/409; H04N 1/4092; H04N 1/52; H04N 1/58; G06K 15/1876; G06K 15/1887; G06K 15/1871; G06K 15/1881

See application file for complete search history.

(56) References Cited

U.S. PATENT DOCUMENTS

| 5,528,270 | A | * | 6/1996 | Tajika | .................. B41J 2/04508 347/19 |
| 5,946,006 | A | * | 8/1999 | Tajika | .................. B41J 2/04508 347/14 |
| 7,201,462 | B2 | * | 4/2007 | Shibata | .................. B41J 2/2139 347/14 |
| 7,306,312 | B2 | * | 12/2007 | Chiwata | .................. B41J 2/205 347/15 |

(Continued)

FOREIGN PATENT DOCUMENTS

JP    2007-83704 A    4/2007

*Primary Examiner* — Scott A Rogers
(74) *Attorney, Agent, or Firm* — Canon U.S.A., Inc. IP Vision

(57) ABSTRACT

An image processing apparatus configured to convert an input image into a halftone image to be output by a recording unit of an output apparatus includes a determination unit configured to determine a correction coefficient based on a characteristic of the recording unit for each of a plurality of pixels in the input image, a filter processing unit configured to perform filter processing on the correction coefficient using a low pass filter, a correction unit configured to correct a pixel value of each of the plurality of pixels in the input image based on the correction coefficient on which the filter processing has been performed, and a halftone processing unit configured to convert a corrected image output from the correction unit into the halftone image by dither processing. The low pass filter is configured to reduce a high-frequency component depending on the dither processing.

20 Claims, 23 Drawing Sheets

(56) References Cited

U.S. PATENT DOCUMENTS

| | | | | |
|---|---|---|---|---|
| 7,826,096 B2* | 11/2010 | Chiwata | ............... | B41J 2/04508 358/3.04 |
| 8,540,332 B2* | 9/2013 | Shibata | .................. | H04N 1/405 347/15 |
| 2007/0046706 A1* | 3/2007 | Kayahara | ............... | B41J 2/2128 347/14 |

* cited by examiner

HALFTONE IMAGE
(DITHER PROCESSING)

HALFTONE IMAGE
(ERROR DIFFUSION
PROCESSING)

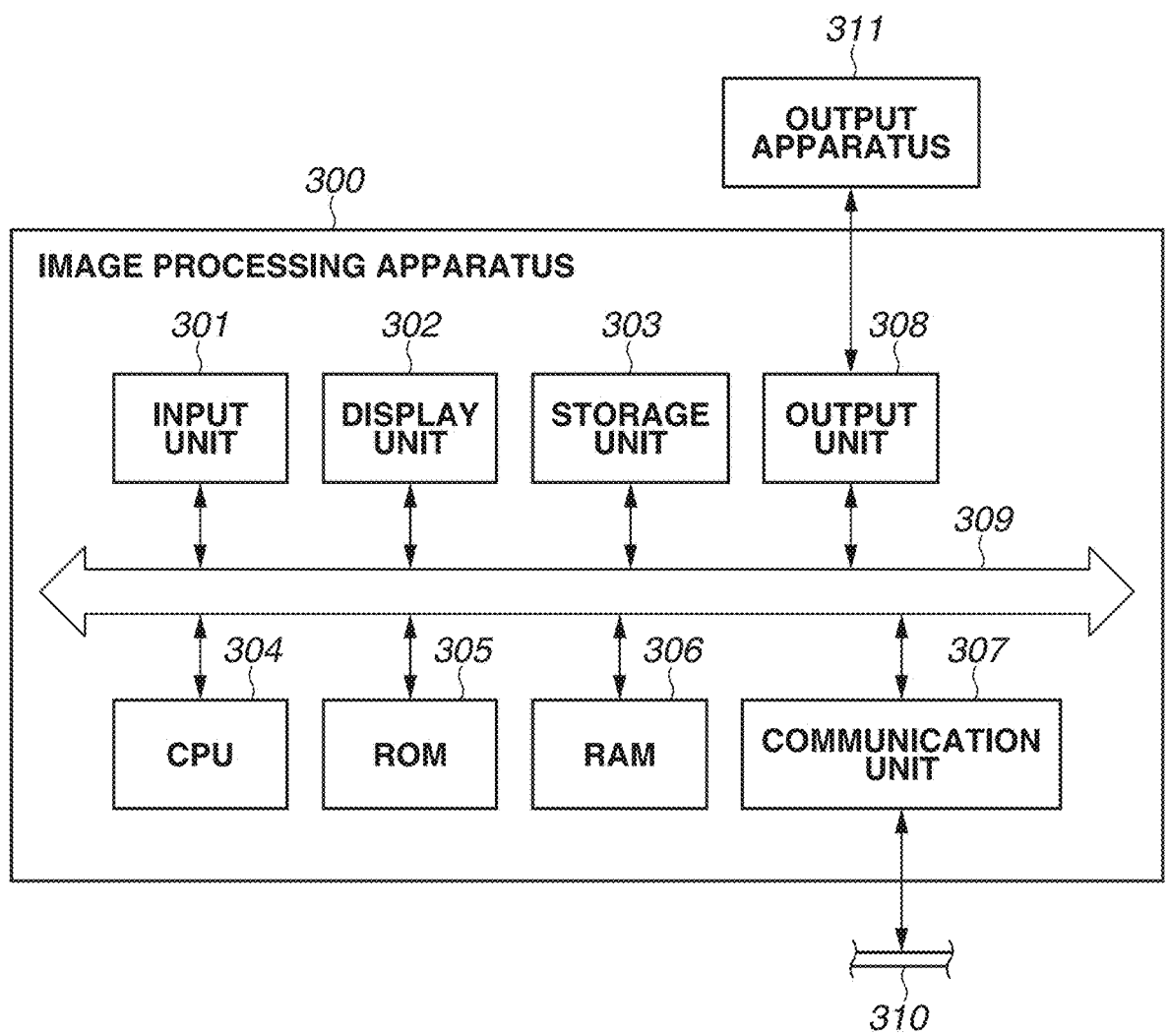

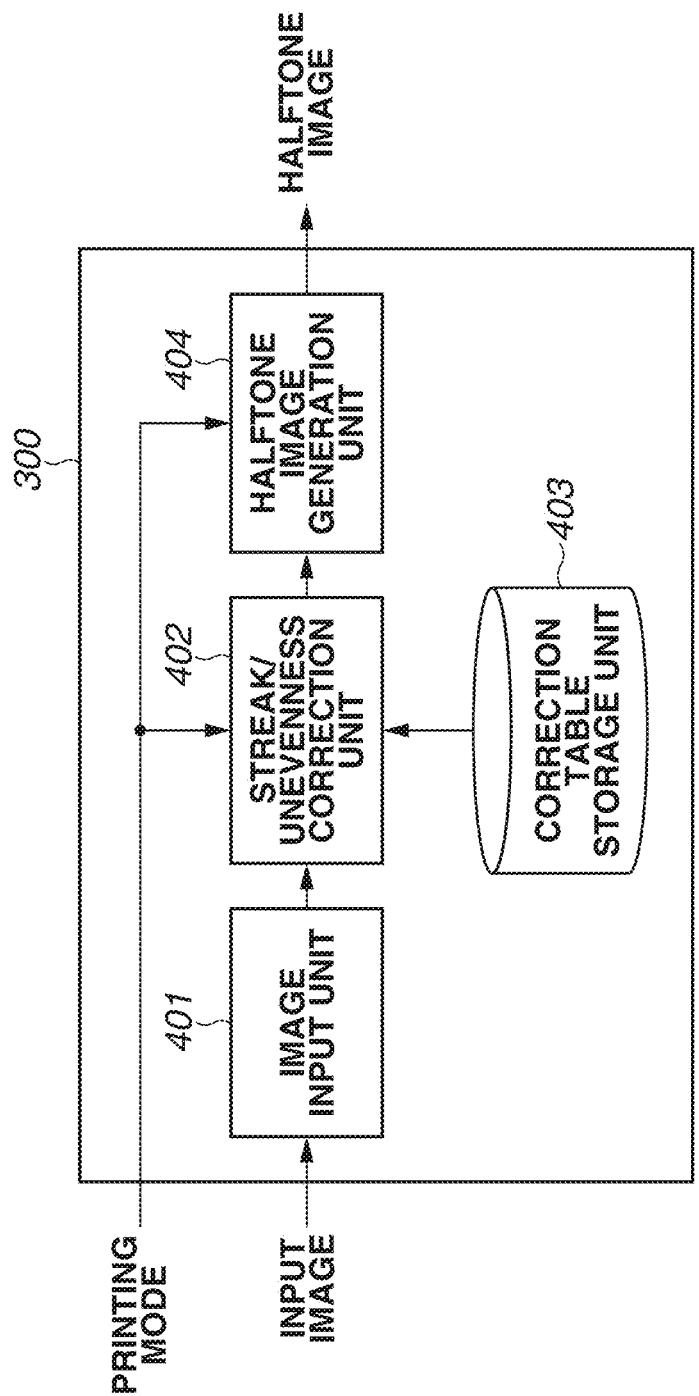

CORRECTED IMAGE
(STREAK/UNEVENNESS
CORRECTION)

FIG.8

| k | INPUT PIXEL VALUE | | | | |
|---|---|---|---|---|---|
| | 0 | 1 | 2 | ... | 255 |
| PIXEL POSITION IN y DIRECTION (PIXEL) — 1 | 0.98 | 1.00 | 1.01 | ... | 1.05 |
| 2 | 1.12 | 1.10 | 1.09 | ... | 1.01 |
| 3 | 1.01 | 0.99 | 0.99 | ... | 0.95 |
| ⋮ | ⋮ | ⋮ | ⋮ | ⋱ | ⋮ |
| Y | 0.99 | 1.01 | 1.02 | ... | 1.07 |

OUTPUT IMAGE
(CORRECTED IMAGE)

OUTPUT IMAGE
(INPUT IMAGE)

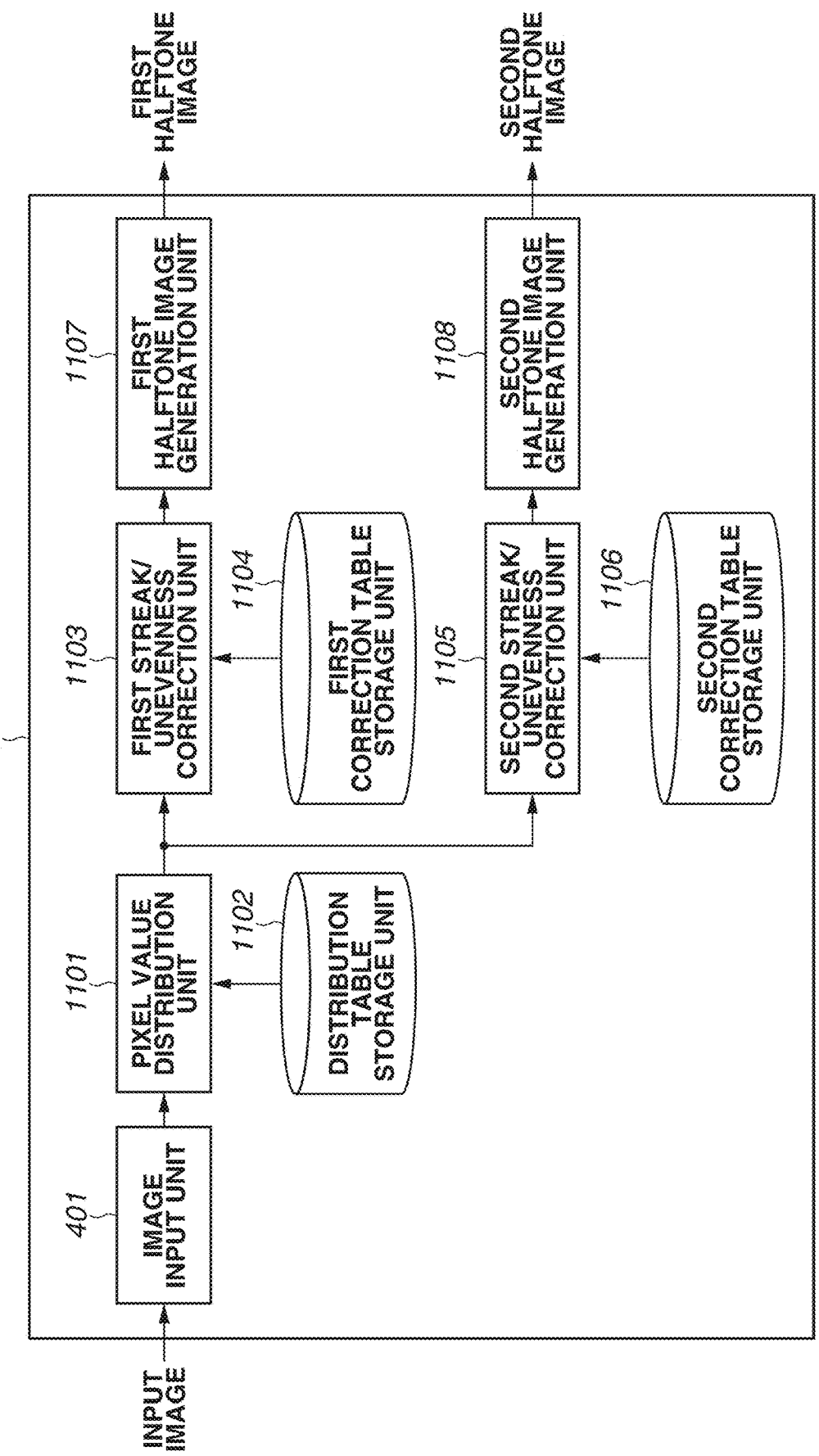

CORRECTED IMAGE
(FIRST STREAK/
UNEVENNESS CORRECTION)

CORRECTED IMAGE
(SECOND STREAK/
UNEVENNESS CORRECTION)

| INPUT PIXEL VALUE | DITHER PROCESSING | ERROR DIFFUSION PROCESSING |
|---|---|---|
| 0 | 0 | 0 |
| 1 | 0 | 1 |
| ⋮ | ⋮ | ⋮ |
| 64 | 0 | 64 |
| ⋮ | ⋮ | ⋮ |
| 255 | 192 | 64 |

FIG.19

| k2 | | INPUT PIXEL VALUE | | | | |
|---|---|---|---|---|---|---|
| | | 0 | 1 | 2 | ... | 255 |
| PIXEL POSITION IN y DIRECTION (PIXEL) | 1 | 0.93 | 0.91 | 0.90 | ... | 0.83 |
| | 2 | 0.81 | 0.82 | 0.85 | ... | 0.88 |
| | 3 | 0.84 | 0.84 | 0.85 | ... | 0.83 |
| | ⋮ | ⋮ | ⋮ | ⋮ | ⋮ | ⋱ | ⋮ |
| | Y | 1.01 | 1.01 | 1.03 | ... | 1.21 |

IMAGE PROCESSING APPARATUS, METHOD, AND COMPUTER PRODUCT LOW PASS FILTERING CORRECTION COEFFICIENT FOR CORRECTING IMAGE THEN SUBJECT TO HALFTONE PROCESSING

BACKGROUND

Field

The present disclosure relates to an image processing technique for generating a halftone image that can be output from an output apparatus configured to record an image.

Description of the Related Art

It is known to perform halftone processing on an image to thereby convert it into a halftone image that an output apparatus can output, when the image is output by a recording apparatus configured to record an image onto a recording medium using the inkjet recording method or the like. On the other hand, there is prepared correction processing for reducing a streak/unevenness caused by, for example, an error of an ink landing position due to a change in a conveyance amount of the recording medium or a discharge direction of ink discharged from a recording unit. Japanese Patent Application Laid-Open No. 2007-83704 aims to reduce the streak/unevenness by performing the halftone processing and printing the image after correcting the image based on printing state information of each nozzle.

SUMMARY

However, it has now been determined that performing the halftone processing on the image after the streak/unevenness correction processing may lead to interference between the halftone processing and a high-frequency component of the image, accordingly causing a moiré that has been absent in the original image.

An aspect of the present disclosure features preventing a phenomenon that the moiré occurs due to the halftone processing on the image with the steak/unevenness corrected therein, while correcting the streak/unevenness when the recording apparatus records the image.

According to another aspect of the present disclosure, an image processing apparatus is configured to convert an input image into a halftone image to be output by a recording unit of an output apparatus. The image processing apparatus includes a determination unit configured to determine a correction coefficient based on a characteristic of the recording unit with respect to each of a plurality of pixels in the input image, a filter processing unit configured to perform filter processing on the correction coefficient using a low pass filter, a correction unit configured to correct a pixel value of each of the plurality of pixels in the input image based on the correction coefficient on which the filter processing has been performed, and a halftone processing unit configured to convert a corrected image output from the correction unit into the halftone image by performing dither processing. The low pass filter is configured to reduce a high-frequency component depending on the dither processing.

Further features of the present disclosure will become apparent from the following description of exemplary embodiments with reference to the attached drawings.

BRIEF DESCRIPTION OF THE DRAWINGS

FIG. 3 illustrates a hardware configuration of an image processing apparatus.

FIG. 4 is a block diagram illustrating a detailed logical configuration of the image processing apparatus.

FIG. 8 illustrates an example of a correction table.

FIG. 11 is a block diagram illustrating a detailed logical configuration of an image processing apparatus.

FIG. 19 illustrates an example of a second correction table.

DESCRIPTION OF THE EMBODIMENTS

Figure 1:
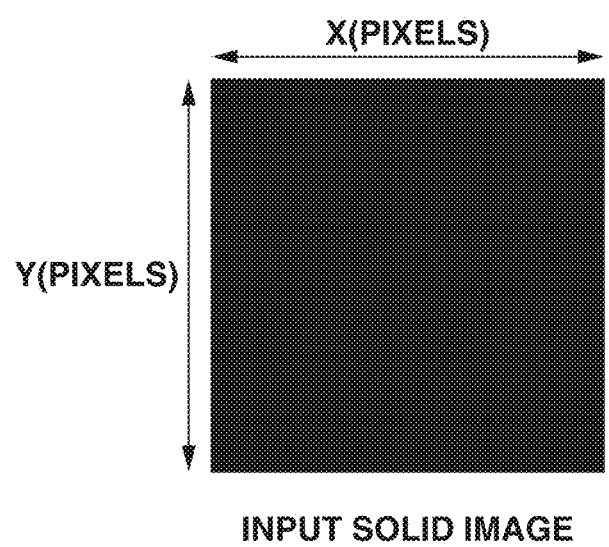
FIG. 1 illustrates an example of an input image.

Exemplary embodiments of the present disclosure will be described with reference to the drawings. The exemplary embodiments that will be described below are not intended to limit the present disclosure, and not all of combinations of features that will be described in these exemplary embodiments are necessarily essential to a solution of the present disclosure. The exemplary embodiments will be described, assigning same reference numerals to configurations that are alike.

A first exemplary embodiment will be described regarding a method for correcting a streak/unevenness depending on a frequency characteristic reproducible by dither processing when a solid image represented by a predetermined pixel value is converted into a halftone image using the dither processing. FIG. 1 illustrates an example of the solid image to be used in the present exemplary embodiment. Each pixel in the solid image is associated with a pixel value $I_0$. A height×width size of the solid image is Y (pixels)×X (pixels). The halftone image is data that can be output by an output apparatus to a recording medium. In the present exemplary embodiment, the output apparatus is an inkjet-type printer. The output apparatus outputs the image onto the recording medium using a recording unit including a nozzle array having a length corresponding to a width of the recording medium in the vertical direction by the full-line method for relatively scanning the recording unit and the recording medium in the horizontal direction. In the present exemplary embodiment, the dither processing is employed as the halftone processing for converting the image into the halftone image. The dither processing is suitable to express an image containing fewer high-frequency components like a flat portion. On the other hand, error diffusion processing is suitable to express a high-frequency component, such as a character/thin line portion and an edge portion, although calculation cost thereof is high.

Figure 2A:
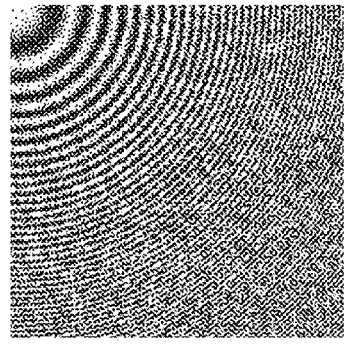
FIGS. 2A and 2B illustrate results of performing dither processing and error diffusion processing on a circular zone plate (CZP) chart, respectively.
Figure 2B:
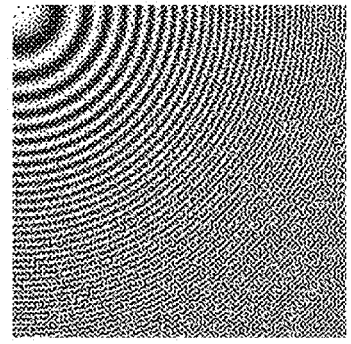

A relationship between the halftone processing and the frequency characteristic will be described. FIGS. 2A and 2B illustrate images generated by converting a circular zone plate (CZP) chart into halftone images using the dither processing and the error diffusion processing, respectively. Each of the halftone images illustrated in FIGS. 2A and 2B are a binary halftone image indicating ON/OFF of ink dot recording. It can be seen that a moiré has occurred due to interference between a high-frequency component and a dither pattern in the halftone image illustrated in FIG. 2A. The halftone image illustrated in FIG. 2B does not contain noticeable interference even with the high-frequency component. In processing of correcting a streak/unevenness depending on a nozzle characteristic, a pixel value of each pixel in the image on which the halftone processing has not been performed is corrected based on a pixel position in the image to be processed. For this reason, when the streak/unevenness correction processing is carried out, the high-frequency component may be contained in the image as a result of the streak/unevenness correction processing even though the original image is a solid image. A method for preventing the phenomenon that the moiré occurs along with the streak/unevenness correction processing while the streak/unevenness correction processing is being performed is to be described in the present exemplary embodiment.

FIG. 3 illustrates a hardware configuration of an image processing apparatus according to the present exemplary embodiment. A central processing unit (CPU) 304 executes an operating system (OS) and various kinds of programs stored in a read only memory (ROM) 305 and a storage unit 303 using a random access memory (RAM) 306 as a work memory, to control components that will be described below via a system bus 309.

An input unit 301 is a serial bus interface, such as Universal Serial Bus (USB). An input device, such as a keyboard and a mouse, and an image input device, such as a memory card reader, a digital camera, and a scanner, are connected to the input unit 301. The CPU 304 inputs a user instruction, image data, and the like via the input unit 301, and displays a graphical user interface (GUI), an image, a processing progress, a processing result, and the like on a display unit 302, which is a monitor.

The storage unit 303 is a recording medium, such as a hard disk drive (HDD) and a solid state drive (SSD), for storing various kinds of programs and various kinds of data therein. The programs stored in the storage unit 303 include a program for realizing image processing that will be described below.

A communication unit 307 is a network interface for connecting to a wired or wireless network 310, such as Wireless Fidelity (Wi-Fi) and Peer-to-Peer (P2P). An output unit 308 is a serial bus interface, such as USB, and outputs image data and the like to an output apparatus 311 and a memory card writer connected to a serial bus.

The CPU 304 communicates with a server apparatus and another computer apparatus in the network 310 via the communication unit 307. The CPU 304 can receive various kinds of programs and data from the server apparatus, the other computer apparatus, and the like in the network 310 to perform processing, and provide data about a processing result to the server apparatus and the other computer apparatus in the network 310. Computer apparatuses that the CPU 304 can communicate with via the communication unit 307 also include the output apparatus 311, and the CPU 304 can also output the image data to the output apparatus 311 via the communication unit 307.

The image processing apparatus 300 is realized by supplying the program for realizing the image processing that will be described below to a computer apparatus, such as a personal computer, a tablet, and a smart-phone. When the tablet or the smart-phone is used as the image processing apparatus 300, the display unit 302 may have a touch screen function, and, in this case, the display unit 302 also functions as the input unit 301 through which the user instruction is input.

FIG. 4 is a block diagram illustrating a detailed logical configuration of the image processing apparatus 300. An image input unit 401 inputs an image specified by a user via the input unit 301. The image input unit 401 outputs an image to be processed to a streak/unevenness correction unit 402. In the present exemplary embodiment, the image to be processed is a monochrome image corresponding to a color of any of recording materials that the output apparatus 311 is equipped with. The image to be processed is 8-bit data having any value of 0 to 255 for each pixel. The streak/unevenness correction unit 402 corrects the pixel value of each pixel in the input image with reference to a printing mode specified by the user that is input via the input unit 301 and a streak/unevenness correction table previously stored in a correction table storage unit 403. The streak/unevenness correction unit 402 outputs a corrected image to a halftone image generation unit 404. The halftone image generation unit 404 converts the corrected image into the halftone image using the halftone processing. In the present example, the dither processing is employed as the halftone processing. The generated halftone image is output to the output apparatus 311 via the output unit 308.

Figure 5:
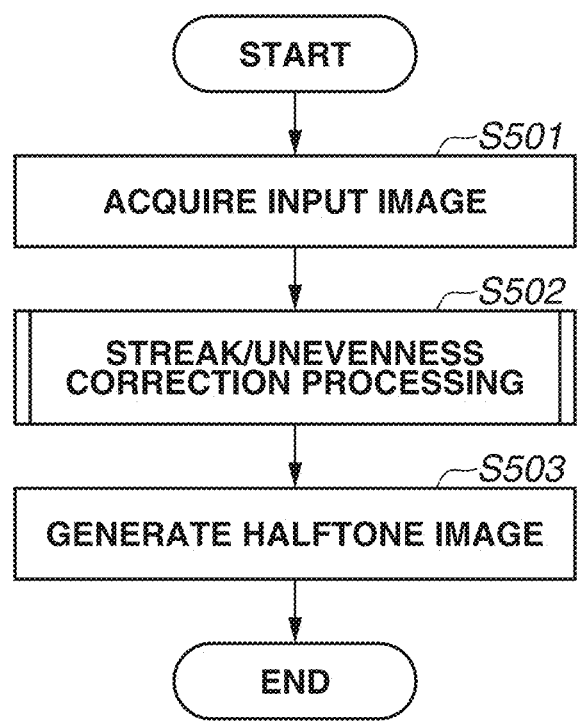
FIG. 5 is a flowchart of image processing to be performed by the image processing apparatus.

An operation of image processing to be performed by the image processing apparatus 300 will be described. FIG. 5 is a flowchart of the image processing to be performed by the image processing apparatus 300. The CPU 304 reads out and executes a program for realizing the flowchart illustrated in FIG. 5, so that each configuration (function) is realized.

In step S501, the image input unit 401 inputs the image to be processed specified by the user. In the present example, the solid image illustrated in FIG. 1 is specified. The image input unit 401 stores the image to be processed into a storage area such as the RAM 306.

In step S502, the streak/unevenness correction unit 402 corrects the pixel value with reference to the streak/unevenness correction table previously stored in the correction table storage unit 403. Details of the streak/unevenness correction processing will be described below.

In step S503, the halftone image generation unit 404 performs the halftone processing on the image to be processed. A dither matrix necessary to perform the halftone processing using the dither processing is previously stored in a predetermined storage area. The halftone image generation unit 404 converts the pixel value of each pixel to either 1 or 0 by applying the dither processing to each pixel in the image to be processed. The halftone image generation unit 404 stores the generated halftone image into a predetermined storage area, and ends the processing.

Figure 6:
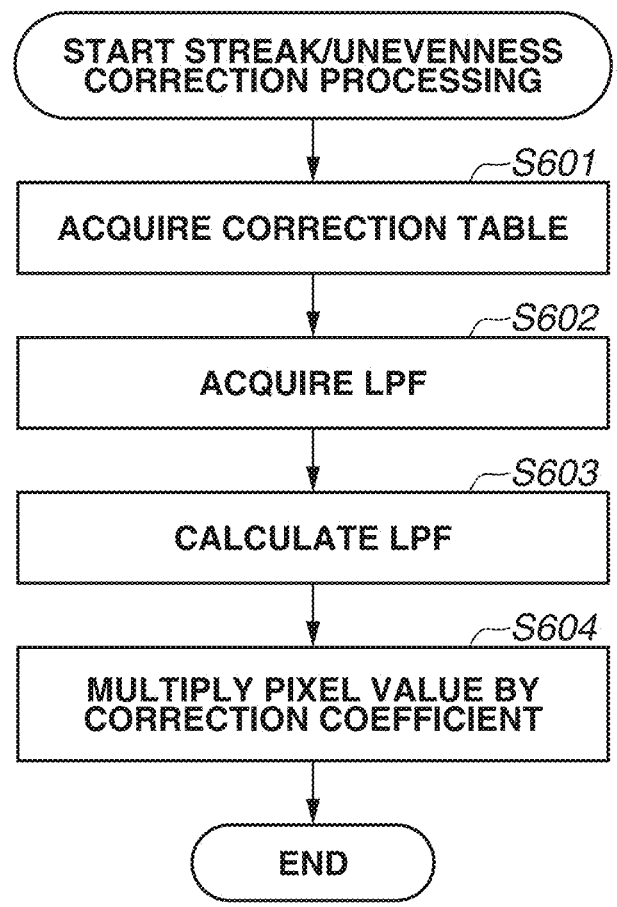
FIG. 6 is a flowchart of streak/unevenness correction processing.
Figure 9A:
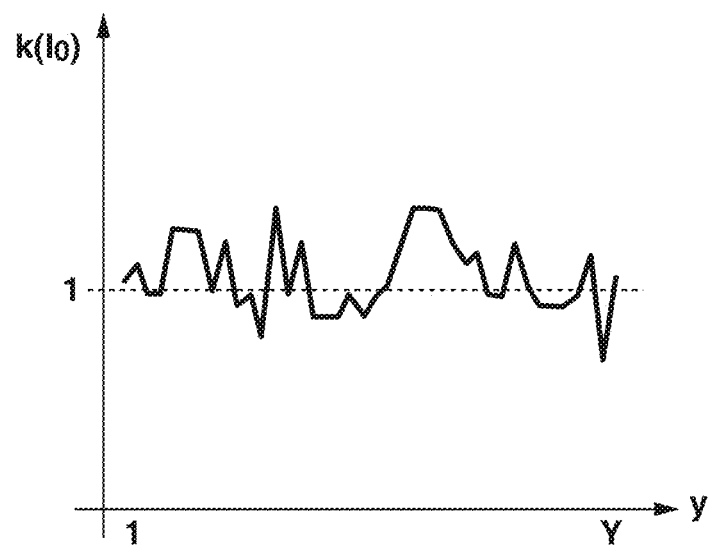
FIGS. 9A and 9B each illustrate a graph indicating a correction coefficient.

Details of the streak/unevenness processing will be described. FIG. 6 is a detailed flowchart of the streak/unevenness correction processing. In step S601, the streak/unevenness correction unit 402 acquires the correction table previously stored in the correction table storage unit 403. The correction table includes a group of correction coefficients each prepared for each pixel position in a Y direction. A correction coefficient k corresponding to each pixel position is calculated based on a recording head characteristic of the output apparatus 311, the pixel value in the input image, and the dither matrix to be used for the dither processing. FIG. 8 illustrates the correction table to be used in the present exemplary embodiment. The correction table is generated in advance and is stored in a predetermined storage area. The streak/unevenness correction unit 402 determines the correction coefficient k depending on the position in the Y direction and the input pixel value with respect to each pixel in the image to be processed with reference to the image to be processed and the correction table. FIG. 9A illustrate an example of the correction coefficient k. A horizontal axis and a vertical axis in FIG. 9A represent the position in the Y direction and the correction coefficient k depending on the input pixel value $I_0$, respectively. In the present exemplary embodiment, the solid image is set as the image to be processed as illustrated in FIG. 1, and for this reason, the correction coefficient k illustrated in FIG. 9A is to be selected in any row in an X direction.

Figure 23A:
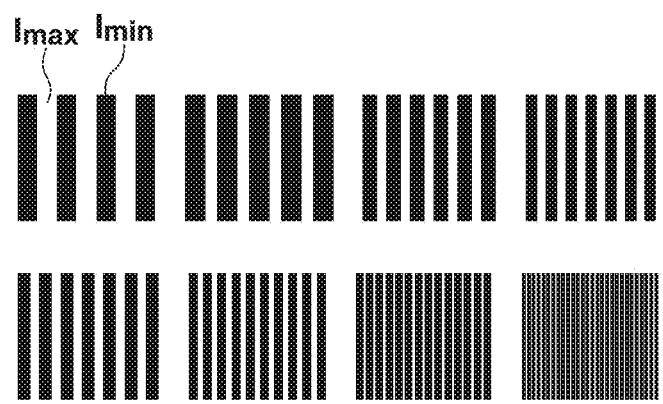
FIGS. 23A and 23B illustrate processing to be performed by a streak/unevenness correction unit.

In step S602, the streak/unevenness correction unit 402 acquires a low-pass filter to be applied to the correction coefficient k. More specifically, the streak/unevenness correction unit 402 acquires information regarding a low-pass filter (hereinafter referred to as an LPF) generated based on the dither matrix used in the present exemplary embodiment from the correction table storage unit 403. In the present example, a one-dimensional filter, which is one-dimensional in the Y direction, is used as the LPF. A one-dimensional Gaussian filter having a standard deviation $\sigma_D$ is previously stored in the correction table storage unit 403 as the information regarding the LPF. In the present exemplary embodiment, the streak/unevenness correction unit 402 outputs a contrast transfer function (CTF) chart image formed of rectangular patterns corresponding to various frequencies as illustrated in FIG. 23A from the output apparatus 311 using the dither method in advance, and calculates a contrast ratio $C_D(f)$ of a rectangular pattern corresponding to a frequency f based on the following equation (1).

$$C_D(f) = \frac{I_{max} - I_{min}}{I_{max} + I_{min}} \quad (1)$$

Figure 23B:
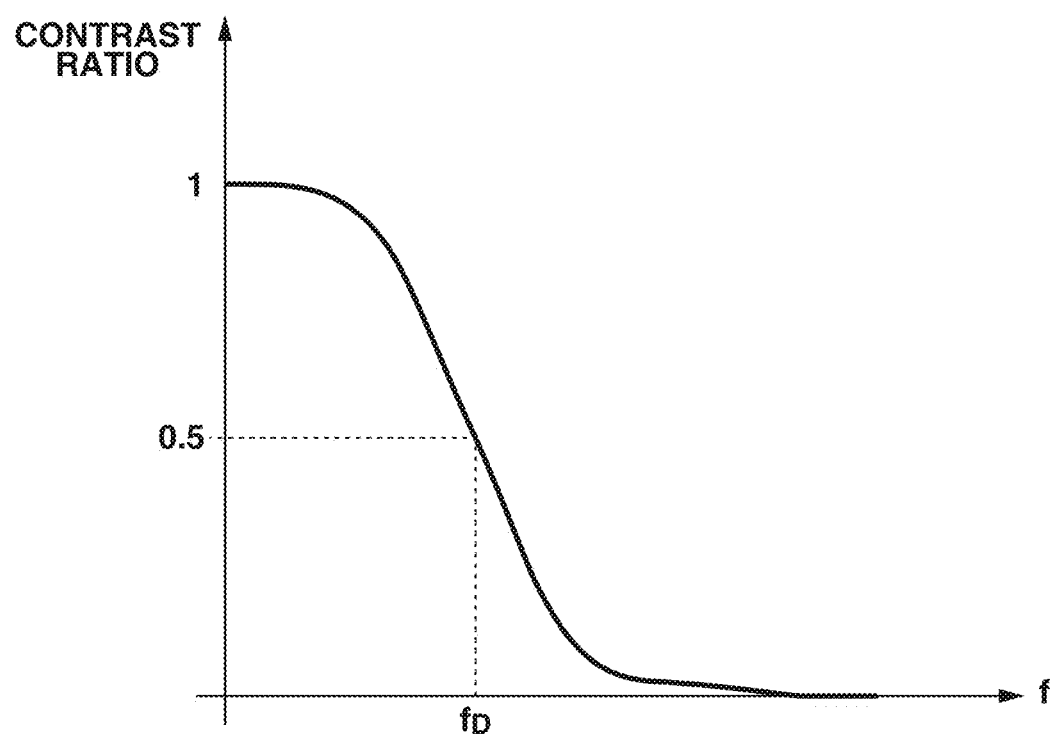

In the equation (1), $I_{max}$ and $I_{min}$ represent luminances of a paper white portion and a black line portion of the rectangular pattern corresponding to the frequency f, respectively. In the present exemplary embodiment, a rectangular pattern according to a frequency $f_D$ has a contrast ratio $C_D(f)$=0.5 as illustrated in FIG. 23B, and a moiré may occur when a frequency component higher than the frequency $f_D$ is input. Accordingly, in this case, the streak/unevenness correction unit 402 calculates in advance the Gaussian filter having the standard deviation $\sigma_D$ calculated based on the following equation (2) as a first LPF.

$$\sigma_D = \frac{f_S}{f_D} \quad (2)$$

In the equation (2), $f_S$ represents a sampling frequency of the output apparatus 311. In the present exemplary embodiment, a rectangular pattern corresponding to $f_D$=300 dpi has the contrast ratio $C_D(f_D)$=0.5. The output apparatus 311 includes a recording head of 1200 dpi, and this means that the sampling frequency is $f_S$=1200 dpi. Consequently, the standard deviation $\sigma_D$ of the Gaussian filter is calculated to be $\sigma_D$=4 (pixels). The one-dimensional Gaussian filter having the calculated standard deviation $\sigma_D$ is acquired as the information regarding the LPF.

Figure 9B:
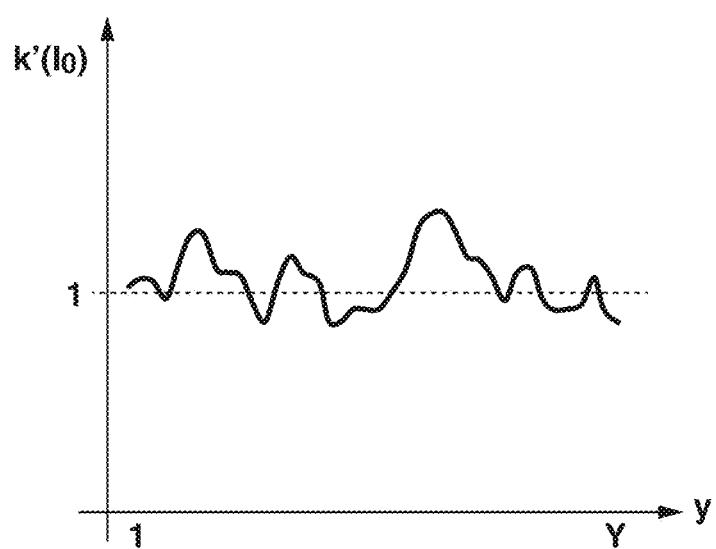

In step S603, the streak/unevenness correction unit 402 performs filter calculation processing on the correction coefficient k corresponding to each pixel using the LPF calculated in step S602 with respect to the Y direction. FIG. 9B illustrates a result of applying the LPF to the correction coefficient k. A smoothly changing correction coefficient $k'(I_0)$ as illustrated in FIG. 9B is calculated by performing the filter processing on the correction coefficient $k(I_0)$ using the LPF. The streak/unevenness correction unit 402 stores the correction coefficient k' calculated by performing the filter processing using the LPF into a predetermined storage area.

Figure 7:
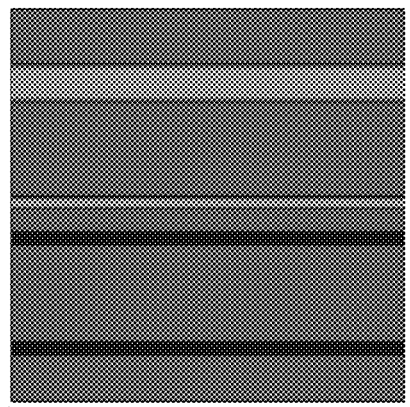
FIG. 7 illustrates a result of performing the streak/unevenness correction processing.

In step S604, the streak/unevenness correction unit 402 corrects the pixel value of each pixel in the image to be processed using the correction coefficient k' calculated in step S603. The streak/unevenness correction unit 402 stores a corrected image including the corrected pixel value being stored in each pixel into a predetermined storage area, and ends the processing. FIG. 7 illustrates the corrected image acquired as a result of carrying out the streak/unevenness correction on the image illustrated in FIG. 1. The density is changed mildly in the corrected image by performing the filter processing on the correction coefficient using the LPF.

Figure 10A:
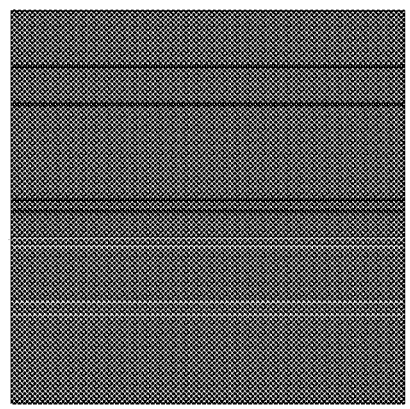
FIGS. 10A and 10B each illustrate an output image.
Figure 10B:
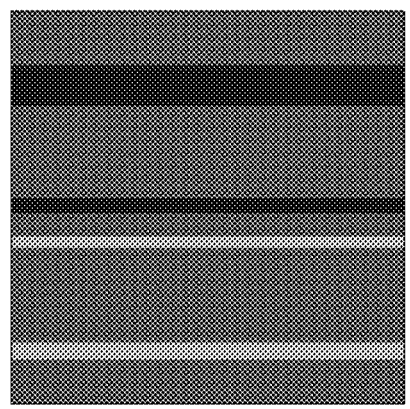

FIGS. 10A and 10B illustrate the image as a result of outputting the input image corrected by the streak/unevenness correction processing according to the present exemplary embodiment on a recording medium from the output apparatus 311. The occurrence of the moiré due to the interference with the dither pattern is prevented while a low-frequency streak/unevenness is reduced in the solid image represented by the pixel value $I_0$ using the dither processing.

In the above-described manner, the high-frequency component is removed based on the dither matrix from the correction coefficient k for carrying out the streak/unevenness correction. As a result, the phenomenon that the moiré occurs due to the application of the dither processing to the image on which the streak/unevenness correction has been performed can be prevented.

FIG. 3 illustrates the configuration in the case where the image processing apparatus 300 and the output apparatus 311 are different apparatuses from each other by way of example, but the image processing apparatus 300 may be built in the output apparatus 311. In this case, the configuration illustrated in FIG. 4 can also be realized by one or a plurality of circuits. The full line-type recording apparatus including the nozzle having the length that covers the width of the recording material is used in the present exemplary embodiment, but a multipass-type recording apparatus may be used and the above-described configuration is not intended to especially limit the configuration of the recording head.

In the present exemplary embodiment, the processing of multiplying the pixel value of each pixel in the input image by the correction coefficient k used in the streak/unevenness correction processing has been described. Besides that, the streak/unevenness may be corrected by using a gamma correction table in synchronization with the nozzle position as the streak/unevenness correction processing. In the case where the streak/unevenness is corrected by using the gamma correction table, this case can be handled by performing the filter processing using the LPF on an output data column of the gamma table with respect to the same input value and updating the gamma correction table with a value obtained after the filter processing is performed.

In the first exemplary embodiment, the method of correcting the streak/unevenness depending on the frequency characteristic of the dither matrix to be used for the halftone processing has been described. However, when there is a streak/unevenness at a further higher frequency than a frequency at which the moiré likely occurs due to the dither processing, the streak/unevenness may not be prevented in some cases. For example, FIG. 10A illustrates an image output with the streak/unevenness corrected therein, and FIG. 10B illustrates an image output without the streak/unevenness corrected therein. In a second exemplary embodiment, a method for preventing the streak/unevenness and also preventing the occurrence of the moiré accompanying the streak/unevenness at the same time by using a plurality of types of halftone processing will be described. In the second exemplary embodiment, configurations that are alike those in the first exemplary embodiment are identified by the same reference numerals and redundant detailed descriptions thereof are omitted.

In the present exemplary embodiment, both the dither processing and the error diffusion processing are applied to the solid image represented by the pixel value $I_0$ illustrated in FIG. 1, and the halftone image is generated by mixing results of the two types of processing. The output apparatus 311 can output the image by recording a large dot with a great ink discharge amount and a small dot with a small ink discharge amount. In the present exemplary embodiment, a halftone image corresponding to the large dot is generated using the dither processing, and a halftone image corresponding to the small dot is generated using the error diffusion processing.

FIG. 11 illustrates a detailed logical configuration of the image processing apparatus 300 according to the present exemplary embodiment. The image input unit 401 inputs the image specified by the user via the input unit 301. The image input unit 401 outputs the input image to a pixel value distribution unit 1101. The pixel value distribution unit 1101 distributes the pixel value of each pixel in the input image to a plurality of planes with reference to a distribution table previously stored in a distribution table storage unit 1102. The pixel value distribution unit 1101 outputs a first pixel value distributed to first halftone processing to a first streak/unevenness correction unit 1103, and outputs a second pixel value distributed to second halftone processing to a second streak/unevenness correction unit 1105.

The first streak/unevenness correction unit 1103 corrects the first pixel value with reference to a first streak/unevenness correction table previously stored in a first correction table storage unit 1104. The first streak/unevenness correction unit 1103 outputs the corrected pixel value to a first halftone image generation unit 1107. The second streak/unevenness correction unit 1105 corrects the second pixel value with reference to a streak/unevenness correction table previously stored in a second correction table storage unit 1106. The second streak/unevenness correction unit 1105 outputs the corrected pixel value to a second halftone image generation unit 1108. The first halftone image generation unit 1107 converts the corrected first pixel value into a binary value indicating ON and OFF of the ink dot by using the first halftone processing. The first halftone image generation unit 1107 outputs a first halftone image in which each pixel has the binary value to the output apparatus 311 via the output unit 308. In the present example, the first halftone processing is the dither processing using the dither matrix. The second halftone image generation unit 1108 converts the corrected second pixel value into a binary value indicating ON and OFF of the ink dot by using the second halftone processing. The second halftone image generation unit 1108 outputs a second halftone image in which each pixel has the binary value to the output apparatus 311 via the output unit 308. The second halftone processing is the error diffusion processing.

Figure 12:
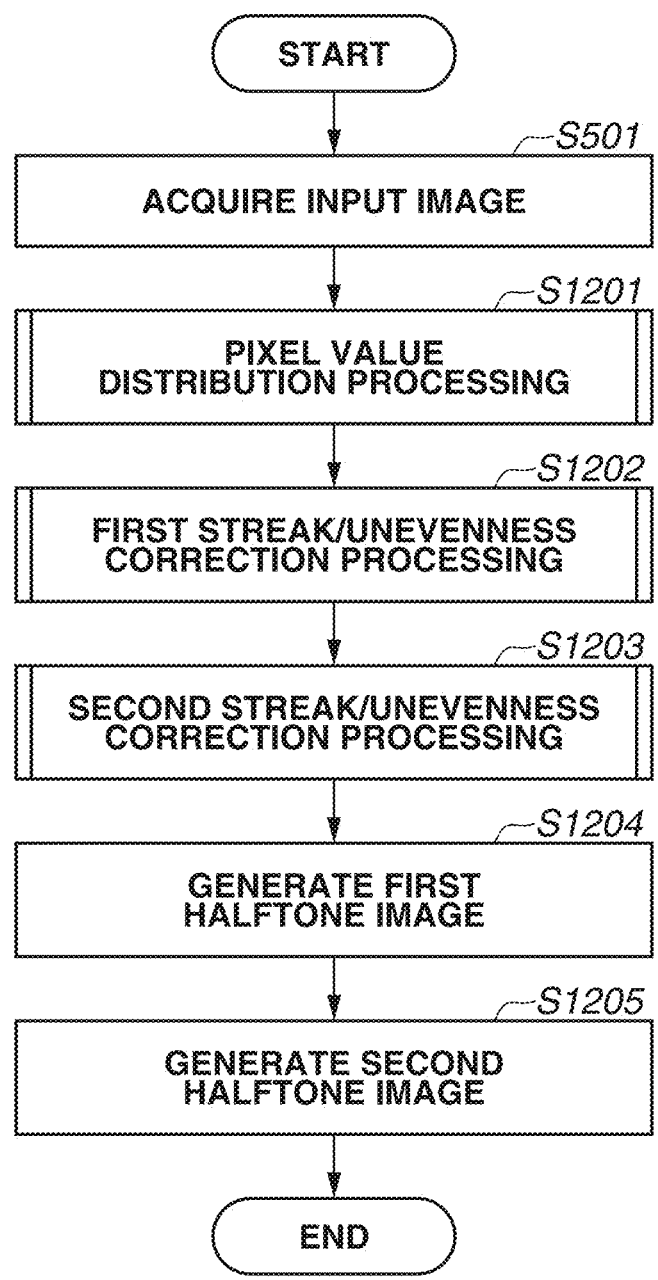
FIG. 12 is a flowchart of image processing to be performed by the image processing apparatus.
Figure 13:
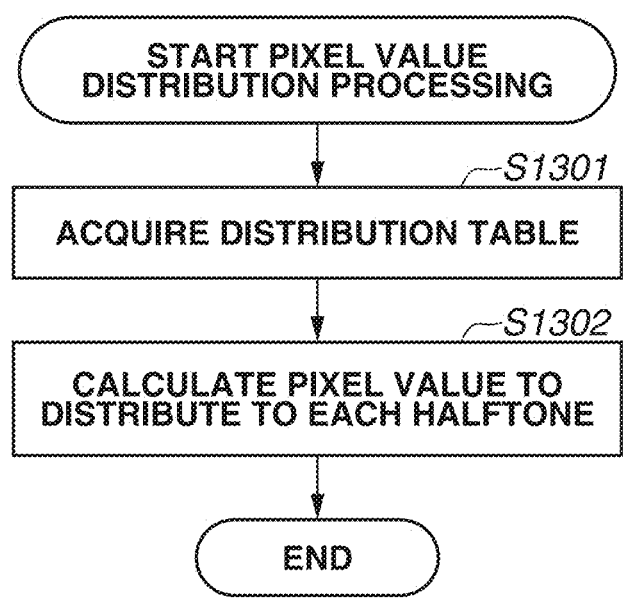
FIG. 13 is a flowchart of pixel value distribution processing.
Figures 18A, 18B:
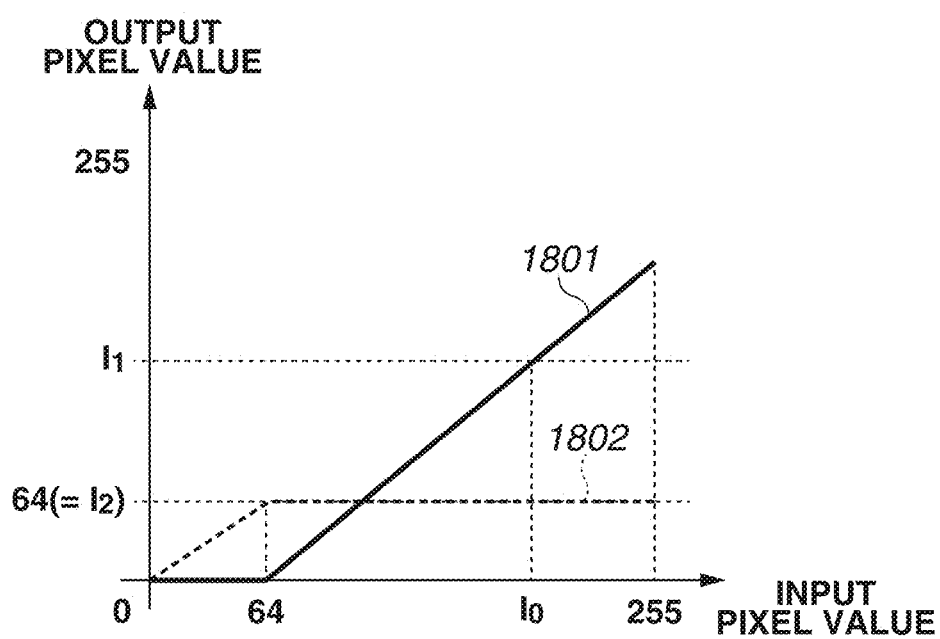
FIG. 18A illustrates an example of a distribution table.
FIG. 18B illustrates a graph into which the distribution table is converted.

FIG. 12 is a flowchart of image processing according to the present exemplary embodiment. In step S1201, the pixel value distribution unit 1101 distributes the pixel value in the input image to each of the halftone processing units with reference to the distribution table previously stored in the distribution table storage unit 1102. FIG. 13 is a detailed flowchart of the pixel value distribution processing. In step S1301, the pixel value distribution unit 1101 acquires the distribution table previously stored in the distribution table storage unit 1102. FIG. 18A illustrates an example of the distribution table. The distribution table indicates amounts to be distributed to the dither processing and the error diffusion processing with respect to each input pixel value. A sum of the pixel value distributed to the dither processing and the pixel value distributed to the error diffusion processing matches the input pixel value. FIG. 18B illustrates a graph into which the distribution table is converted. The input pixel value is distributed to the dither processing and the error diffusion processing as indicated by pixel values expressed as a solid line 1801 and a broken line 1802, respectively. The input pixel values of 0 to 64 corresponding to a highlight side are all distributed to the error diffusion processing, and the input pixel values of 64 to 255 are distributed to both the dither processing and the error diffusion processing. In the present exemplary embodiment, the present processing will be described, on the assumption that the pixel value $I_0$ of the input image is a pixel value satisfying $64<I_0<255$ by way of example.

In step S1302, the pixel value distribution unit 1101 distributes the pixel value of each pixel in the image to be processed to each of the halftone processing units based on the distribution table. The pixel value distributed to the dither processing will be represented by $I_1$, and the pixel value distributed to the error diffusion processing will be represented by $I_2$. In other words, $I_0=I_1+I_2$ is established.

Figure 14A:
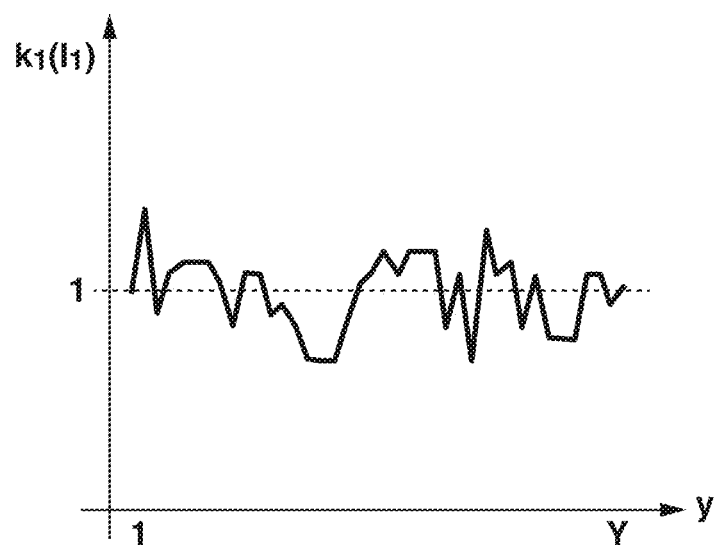
FIGS. 14A and 14B each illustrate a graph indicating a first correction coefficient.
Figure 14B:
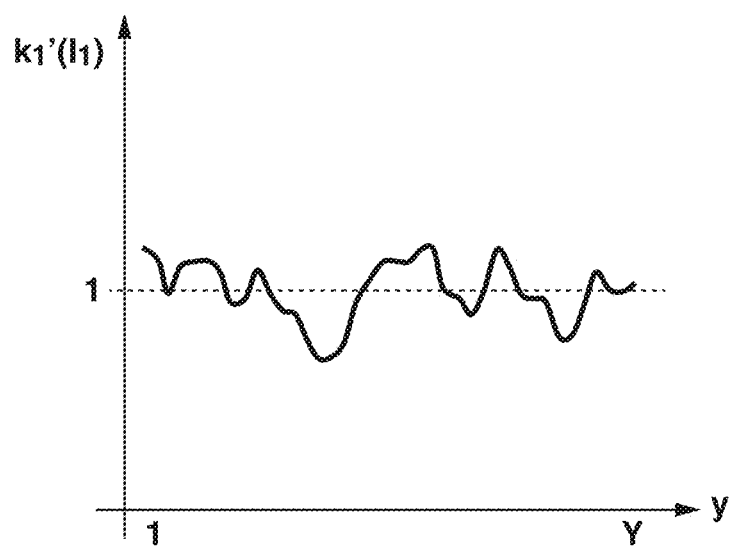
Figure 15:
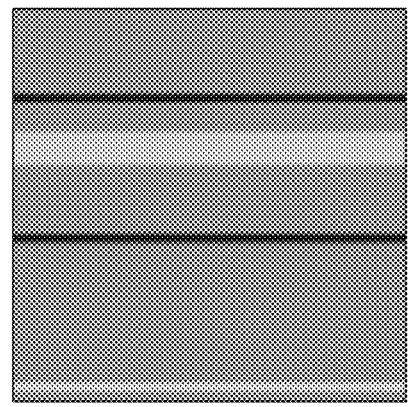
FIG. 15 illustrates an image output from a first streak/unevenness correction unit.

In step S1202, the first streak/unevenness correction unit 1103 corrects the first pixel value with reference to the streak/unevenness correction table previously stored in the first correction table storage unit 1104. Details of the first streak/unevenness correction processing are alike those of step S502 according to the first exemplary embodiment. In the present exemplary embodiment, the first streak/unevenness correction unit 1103 acquires a first correction coefficient $k_1(I_1)$ illustrated in FIG. 14A from the first correction table, and calculates a first correction coefficient $k_1'(I_1)$ on which the filter processing has been performed as illustrated in FIG. 14B. Accordingly, in the present exemplary embodiment, an image represented by a pixel value illustrated in FIG. 15 is calculated as a pixel value for correcting the streak/unevenness to be generated when a solid image represented by the pixel value $I_1$ is output. The image represented by the corrected pixel value blurs due to the low-pass filter (hereinafter referred to as the LPF) calculation carried out to prevent the interference with the dither pattern.

Figure 17:
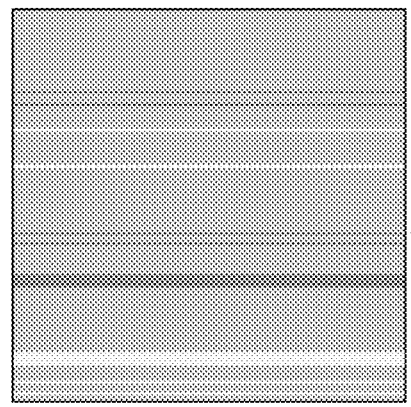
FIG. 17 illustrates an image output from the second streak/unevenness correction unit.

In step S1203, the second streak/unevenness correction unit 1105 corrects the second pixel value with reference to the streak/unevenness correction table previously stored in the second correction table storage unit 1106. The second streak/unevenness correction unit 1105 does not carry out the correction using the LPF. In the present exemplary embodiment, an image represented by a pixel value illustrated in FIG. 17 is calculated as a pixel value for correcting the streak/unevenness to be generated when a solid image represented by the pixel value $I_2$ is output.

In step S1204, the first halftone image generation unit 1107 performs the dither processing on the corrected first pixel value. In step S1205, the second halftone image generation unit 1108 performs the error diffusion processing on the corrected second pixel value.

In the above-described manner, in the present exemplary embodiment, the streak/unevenness at a higher frequency than the frequency characteristic of the dither processing can be reduced by performing the plurality of types of halftone processing on the input image.

Figure 16:
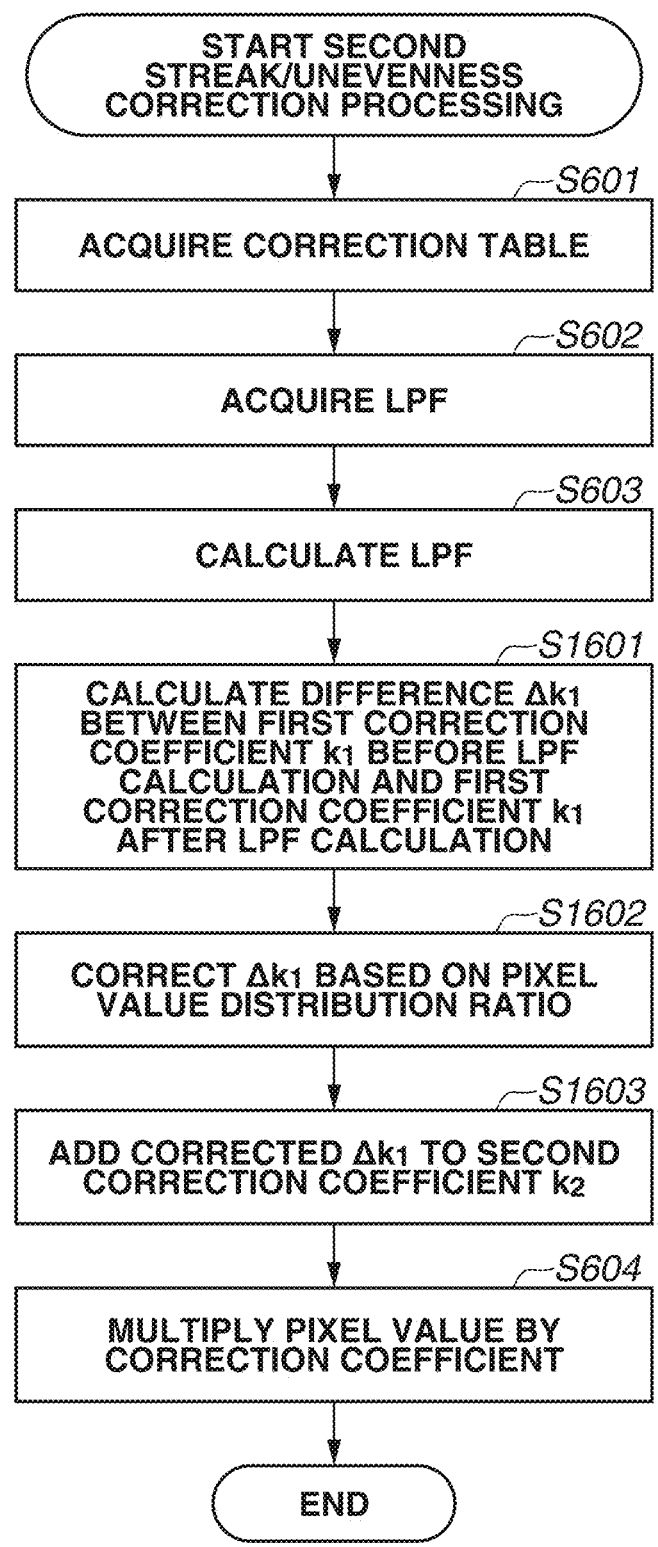
FIG. 16 is a flowchart of processing to be performed by a second streak/unevenness correction unit.
Figure 20:
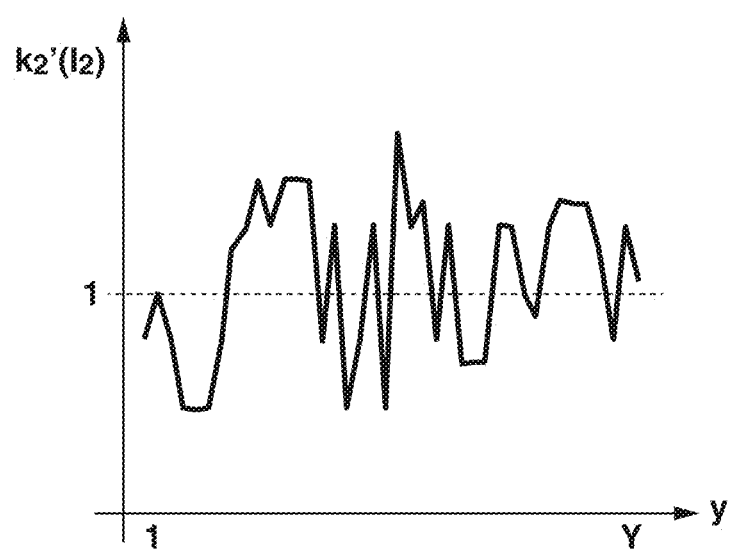
FIG. 20 illustrates a graph indicating the correction coefficient.

An exemplary modification of the second streak/unevenness correction processing in step S1203 will be described with reference to a flowchart illustrated in FIG. 16. Steps S601 to S603 are alike those in the first exemplary embodiment, and therefore redundant descriptions thereof will be omitted here. In the present exemplary embodiment, a correction coefficient $k_2$ with respect to the pixel position (pixel) in the Y direction that is to be calculated based on the recording head characteristic of the output apparatus 311 and the halftone image acquired by applying the error diffusion processing to the input pixel value is acquired as the second correction table. FIG. 19 illustrates the second correction table. In the present exemplary embodiment, a one-dimensional Gaussian filter having a standard deviation $\sigma_E$ depending on the error diffusion processing is acquired as the LPF. In a case where the error diffusion processing is used, the standard deviation $\sigma_E$ satisfies $\sigma_E < \sigma_D$, and in this case the moiré less likely occurs even with the high-frequency component in the input image than in a case where the dither processing method is used. In the present exemplary embodiment, a kernel size of the filter is $3\sigma_E$ (pixels). FIG. 20 illustrates a second correction coefficient $k_2'(I_2)$ acquired by performing the filter processing using the one-dimensional Gaussian filter having the standard deviation $\sigma_E$ on the correction coefficient $k_2'(I_2)$ with respect to the pixel value $I_2$ that is acquired from the second correction table. In step S1601, the second streak/unevenness correction unit 1105 calculates a difference $\Delta k_1$ between the correction coefficient $k_1$ acquired in step S1202 and the first correction coefficient $k_1'$ on which the filter processing has been performed, based on the following equation (3).

$$\Delta k_1 = k_1 - k_1' \tag{3}$$

Figure 21:
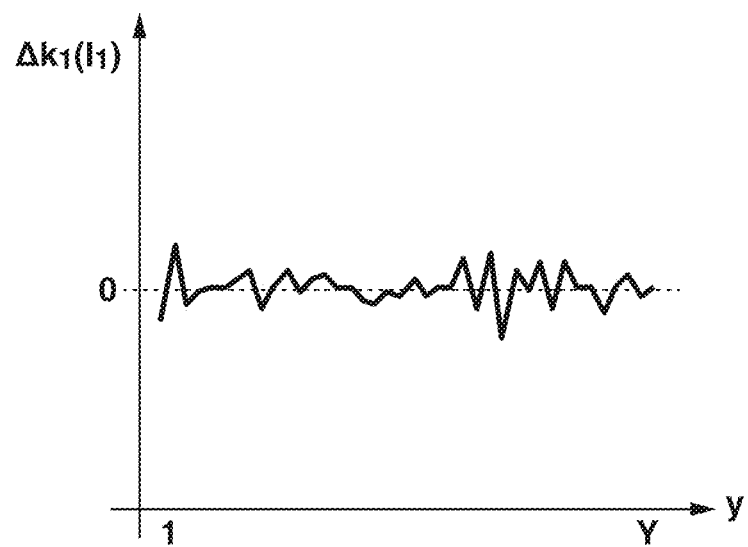
FIG. 21 illustrates a graph indicating a difference between the first correction coefficients.

In the present exemplary embodiment, the high-frequency component of the streak/unevenness that cannot be corrected by the dither processing is calculated as the difference $\Delta k_1(I_1)$, as illustrated in FIG. 21. The calculated difference $\Delta k_1$ between the first correction coefficients is stored into a predetermined storage area.

In step S1602, the second streak/unevenness correction unit 1105 calculates a difference $\Delta k_1'$ between the first correction coefficients as indicated by the following equation (4).

$$\Delta k_1' = \frac{I_1}{I_2} \Delta k_1 \tag{4}$$

In step S1603, the second streak/unevenness correction unit 1105 adds the difference $\Delta k_1'$ between the first correction coefficients corrected in step S1602 to the second correction coefficient $k_2$ acquired in step S601 based on the following equation (5).

$$k_{2+\Delta} = k_2 + \Delta k_1' \tag{5}$$

Figure 22:
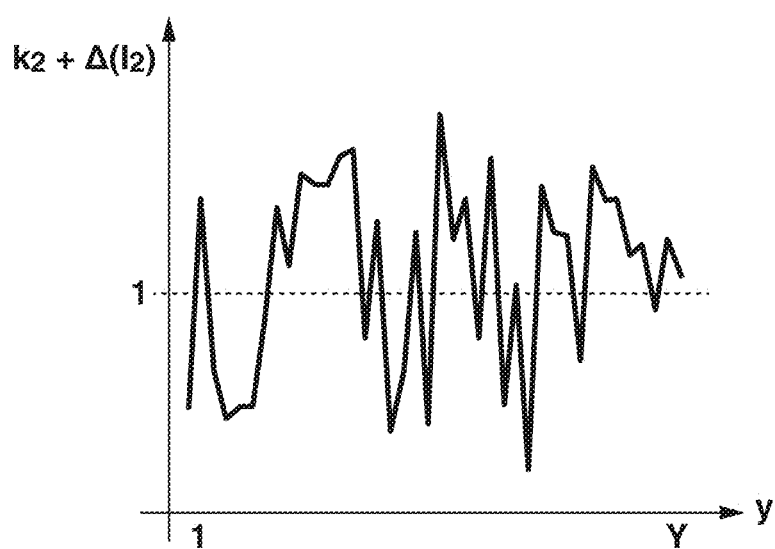
FIG. 22 illustrates a graph indicating a value obtained by adding the difference between the first correction coefficients to the second correction coefficient.

In the equation (5), $k_{2+\Delta}$ is the second correction coefficient resulting from the addition. In the present exemplary embodiment, $k_{2+\Delta}$ is a coefficient acquired by adding the high-frequency component of the streak/unevenness that cannot be corrected by the dither processing to the second correction coefficient $k_2(I_2)$ with respect to the pixel value $I_2$ as illustrated in FIG. 22.

The image processing apparatus 300 can add the high-frequency component of the streak/unevenness that cannot be corrected by the dither processing to the correction coefficient of the error diffusion processing and accurately reduce the high-frequency streak/unevenness by performing the second streak/unevenness correction processing on the input image.

The halftone image is generated using the dither processing for the large dot and the halftone image is generated using the error diffusion processing for the small dot in the present exemplary embodiment, but, alternatively, the error diffusion processing and the dither processing may be used for the large dot and the small dot, respectively, and the above-described example is not intended to especially limit the combination of the dot size and the halftone processing.

The present exemplary embodiment uses the processing apparatus that records the dots with the different ink discharge amounts, but may use a processing apparatus that records the dots with dark and light inks having different densities from each other, and the above-described example is not intended to especially limit the ink discharge amount and the density of the dot recorded in each halftone pattern.

It is possible to prevent the phenomenon that the moiré occurs due to the halftone processing on the image with the steak/unevenness corrected therein, while preventing the streak/unevenness when the recording apparatus records the image.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the particular disclosed exemplary embodiments. The scope of the following claims is to be accorded the broadest interpretation so as to encompass all such modifications and equivalent structures and functions.

This application claims the benefit of Japanese Patent Application No. 2019-089365, filed May 9, 2019, which is hereby incorporated by reference herein in its entirety.

What is claimed is:

1. An image processing apparatus configured to convert an input image into a halftone image to be output by a recording apparatus of an output apparatus, the image processing apparatus comprising:
    one or more processors; and
    one or more memories containing instructions that, when executed by the one or more processors, cause the one or more processors to function as:
    a determination unit configured to determine a correction coefficient based on a characteristic of the recording apparatus with respect to each of a plurality of pixels in the input image,
    a filter processing unit configured to perform filter processing on the correction coefficient using a low pass filter,
    a correction unit configured to correct a pixel value of each of the plurality of pixels in the input image based on the correction coefficient on which the filter processing has been performed, and
    a halftone processing unit configured to convert a corrected image output from the correction unit into the halftone image by performing dither processing,
    wherein the low pass filter is configured to reduce a high-frequency component depending on the dither processing.

2. The image processing apparatus according to claim 1, wherein the correction coefficient is determined for each position in a specified direction in the input image.

3. The image processing apparatus according to claim 1, wherein the low pass filter is a one-dimensional filter in the specified direction.

4. The image processing apparatus according to claim 1, wherein the low pass filter is a Gaussian filter.

5. The image processing apparatus according to claim 1, wherein the correction unit is a correction unit configured to prevents at least one of a streak and an unevenness from being generated when the output apparatus outputs the image.

6. The image processing apparatus according to claim 1, wherein the determination unit determines the correction coefficient with reference to a correction table generated in advance.

7. The image processing apparatus according to claim 6, wherein the correction table is a table that holds the correction coefficient corresponding to the pixel value and a pixel position in the input image.

8. The image processing apparatus according to claim 1, wherein the correction unit corrects the pixel value of each pixel in the input image by multiplying the pixel value of each pixel in the input image by the correction coefficient on which the filter processing has been performed.

9. The image processing apparatus according to claim 1,
    wherein the halftone processing unit outputs the halftone image to the output apparatus, and
    wherein the output apparatus records the image onto a recording medium using the recording apparatus based on the halftone image.

10. The image processing apparatus according to claim 1, wherein the one or more processors further function as a distribution unit configured to distribute the pixel value of each pixel in the input image to a first pixel value and a second pixel value,
    wherein the halftone processing unit performs dither processing on the first pixel value and performs halftone processing different from the dither processing on the second pixel value.

11. The image processing apparatus according to claim 10,
    wherein the determination unit determines a first correction coefficient to be used for the first pixel value and a second correction coefficient to be used for the second pixel value, and
    wherein the correction unit includes a first streak/unevenness correction unit configured to correct the first pixel value using the first correction coefficient, and a second correction unit configured to correct the second pixel value using the second correction coefficient.

12. The image processing apparatus according to claim 11, wherein the filter processing unit performs the filter processing on the first correction coefficient and does not perform the filter processing on the second correction coefficient.

13. The image processing apparatus according to claim 10,
    wherein the output apparatus is an apparatus capable of recording a first dot, and a second dot with a larger ink discharge amount than the first dot, and
    wherein the halftone processing unit generates the halftone image corresponding to the first dot by performing error diffusion processing, and generates the halftone image corresponding to the second dot by performing the dither processing.

14. The image processing apparatus according to claim 10, wherein the distribution unit distributes the pixel value of each pixel in the input image to the first pixel value and the second pixel value with reference to a distribution table generated in advance.

15. The image processing apparatus according to claim 14, wherein the distribution table is a table that holds the first pixel value and the second pixel value corresponding to the pixel value in the input image.

16. The image processing apparatus according to claim 11, wherein the filter processing unit calculates a difference between the first correction coefficient and the first correction coefficient on which the filter processing has been performed, and adds a value corresponding to the difference to the second correction coefficient.

17. The image processing apparatus according to claim 16, wherein the filter processing unit adds a value to be calculated based on the difference, the first pixel value, and the second pixel value to the second correction coefficient.

18. The image processing apparatus according to claim 17, wherein the filter processing unit adds a value to be acquired by multiplying the difference by a ratio of the first pixel value to the second pixel value to the second correction coefficient.

19. An image processing method for converting an input image into a halftone image to be output by a recording apparatus of an output apparatus, the image processing method comprising:

determining a correction coefficient based on a characteristic of the recording apparatus with respect to each of a plurality of pixels in the input image;

performing filter processing on the correction coefficient using a low-pass filter for reducing a high-frequency component depending on dither processing;

correcting a pixel value of each of the plurality of pixels in the input image based on the correction coefficient on which the filter processing has been performed; and converting a corrected input image provided by the correcting into the halftone image by performing the dither processing.

20. A non-transitory computer-readable storage medium storing instructions that, when executed by a computer, cause the computer to perform a method for converting an input image into a halftone image to be output by a recording appartus of an output apparatus, the method comprising:

determining a correction coefficient based on a characteristic of the recording apparatus with respect to each of a plurality of pixels in the input image;

performing filter processing on the correction coefficient using a low-pass filter for reducing a high-frequency component depending on dither processing;

correcting a pixel value of each of the plurality of pixels in the input image based on the correction coefficient on which the filter processing has been performed; and converting a corrected input image provided by the correcting into the halftone image by performing the dither processing.

* * * * *